Sept. 1, 1931. M. M. FISHER 1,821,178
HYDRAULIC BRAKE
Filed June 20, 1927 3 Sheets-Sheet 1

INVENTOR
Martin M. Fisher.
BY
Carl H. Crawford
ATTORNEY

Sept. 1, 1931.　　　　M. M. FISHER　　　　1,821,178
HYDRAULIC BRAKE
Filed June 20, 1927　　　3 Sheets-Sheet 2
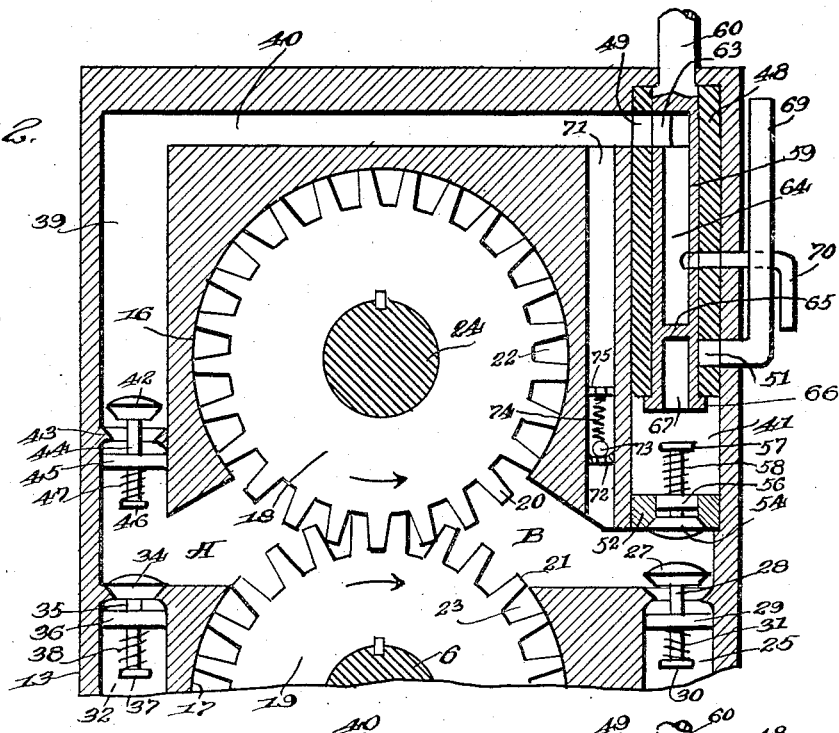
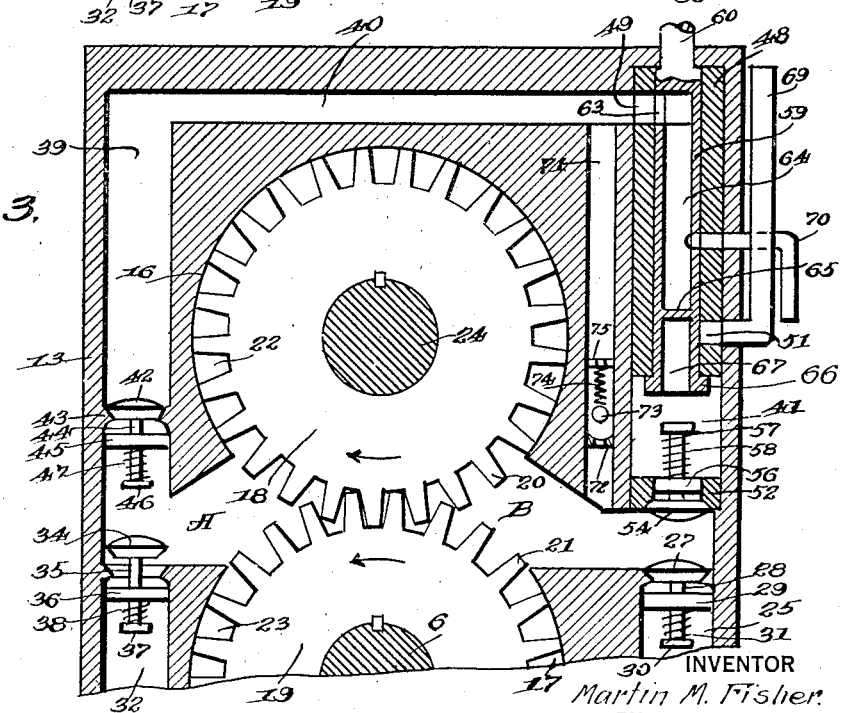
INVENTOR
Martin M. Fisher
BY
Carl H. Crawford
ATTORNEY Sept. 1, 1931. M. M. FISHER 1,821,178
HYDRAULIC BRAKE
Filed June 20, 1927 3 Sheets-Sheet 3
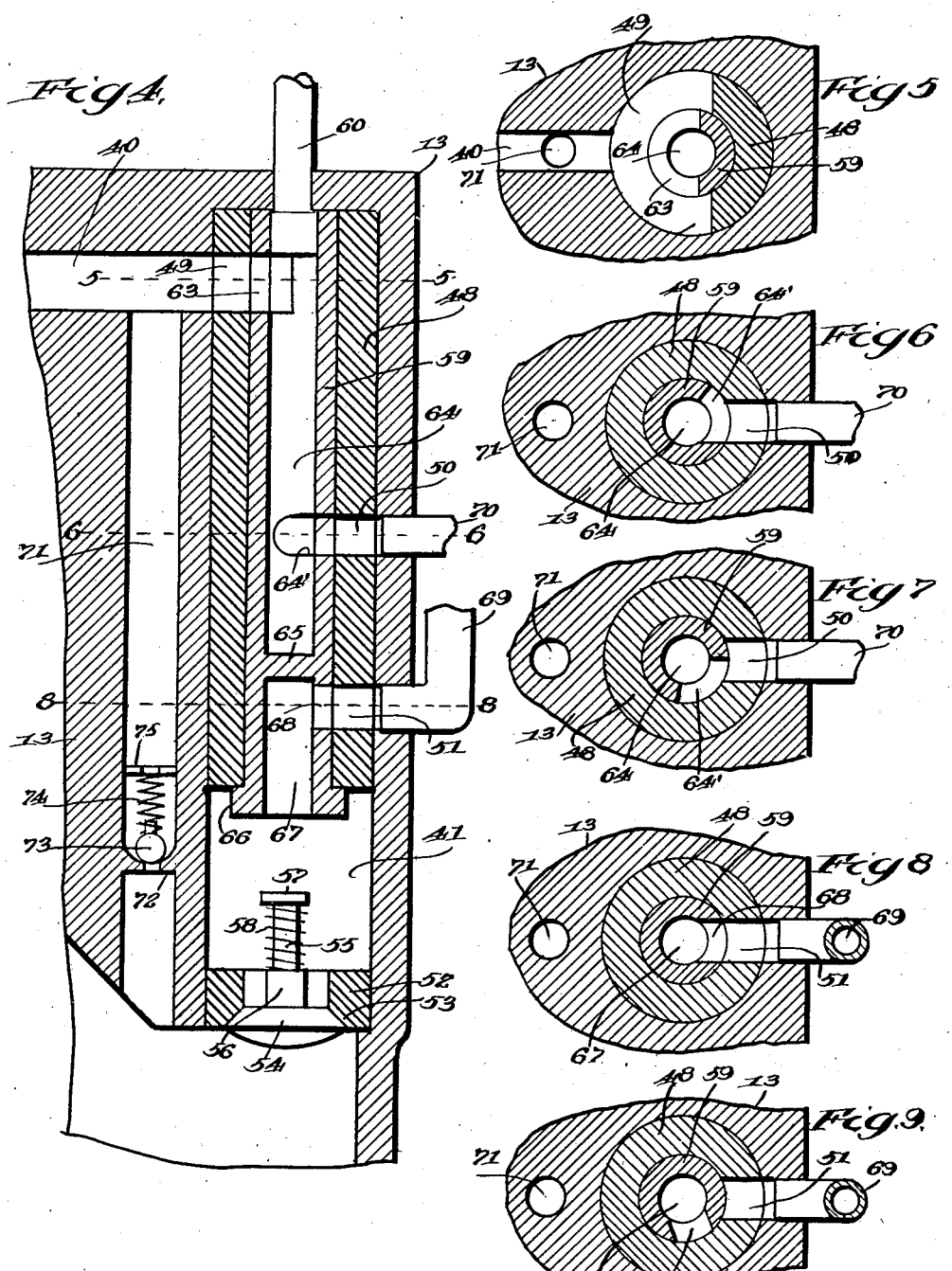
INVENTOR
Martin M. Fisher
BY
Carl H. Crawford
ATTORNEY Patented Sept. 1, 1931

1,821,178

UNITED STATES PATENT OFFICE

MARTIN M. FISHER, OF SEATTLE, WASHINGTON, ASSIGNOR, BY MESNE ASSIGNMENTS, TO HASSETT BRAKE COMPANY, OF YAKIMA, WASHINGTON, A CORPORATION OF WASHINGTON

HYDRAULIC BRAKE

Application filed June 20, 1927. Serial No. 200,206.

This invention relates to improvements in hydraulic brakes for vehicles and to an improved method therefor.

One of the features of this invention is to afford normally free and effective oil ingress to the brake responsive to suction thereof in the absence of any controlling means directly governing such ingress.

A further feature resides in means for controlling air admission to the brake to arrest braking action, preferably by vitiating the suction action whereby oil ingress is effected.

A further object is to embody such means in a form whereby it will function to initiate or cause initiation of oil ingress to start and sustain braking stress when the air ingress to said brake is shut off.

The invention involves an oil path in which are disposed vehicle driven members such as gears, on opposite sides of which are pressure chambers to which the oil is fed by suction of the gears, such feed being wholly responsive to such suction action thereby insuring an ample supply of oil to the pressure chambers for effecting brakage, and avoiding heating of the oil.

A further feature resides in connecting said chambers with a passage through which both oil and air may travel, and in the provision of a controlling valve in or in such controlling relation to such passage as to control air ingress thereto, and throttle oil and air egress therefrom, such throttling function serving to control the extent of application of brakage.

A further feature consists in providing a by-pass from said passage to one of the pressure chambers and equipping said by-pass with a non-return egress device serving to permit discharge of oil through said by-pass from one pressure chamber when rearward braking action is being applied, the non-return closing ingress to said chamber at all times.

The invention has many other features and objects which will be more fully described in connection with the accompanying drawings and which will be more particularly pointed out in and by the appended claims.

In the drawings:—

Fig. 1 is a sectional view on line 1—1 of Fig. 10, showing the most improved form of my invention in the non-braking adjustment with air flowing freely through the oil path.

Fig. 2 is a fragmentary sectional view similar to Fig. 1, in a braking adjustment against forward travel of the vehicle with air ingress closed.

Fig. 3 is a view similar to Fig. 2, with the brake in an adjustment opposing rearward travel of the vehicle.

Fig. 4 is an enlarged sectional view of the controlling valve.

Fig. 5 is a sectional view on line 5—5 of Fig. 4.

Fig. 6 is a sectional view on line 6—6 of Fig. 4 showing the throttling valve in a full air and oil egressing adjustment.

Fig. 7 is a similar view of said throttling valve in a partly throttling position.

Fig. 8 is a sectional view of the air ingress valve on line 8—8 of Fig. 4, showing the valve in a full air ingress adjustment.

Fig. 9 is a view similar to Fig. 8, with the air ingress closed.

Fig. 10 is a diagrammatic view showing the manner in which the brake is mounted and disposed on an automobile.

Like characters of reference designate similar parts throughout the different figures of the drawings.

I will first refer briefly to Fig. 10, wherein the frame of an automobile is generally designated at 1, the rear wheels at 2 and the differential at 3. A section of the drive shaft leading rearwardly from the transmission is shown at 4, and a section extending to the differential is shown at 5. It is a feature of the invention to interpose a drive shaft section 6, which may be termed a connecting section, between sections 4 and 5, and connected therewith by means such as universal joints 7 and 8. This flexible connection enables me to dispose the brake casing 9, in advance of the differential 3, section 6 passing through and being operatively connected with my improved brake. The casing 9, is suitably hung from the frame 1, as generally indicated at 10, thereby taking any injurious strain or stress off from the drive shaft when braking action is applied. Thus, it will be seen that my improved brake acts through the differential 3, the same as if it were mounted on the rear of the differential. Further, by mounting the brake in advance of the latter, I afford road clearance of a greater extent for some of the heavy duty motor vehicles that are hung low.

The casing 9, as shown in Fig. 1, includes an outer shell 10', which functions primarily as an oil and air reservoir, the oil level being indicated at 11 and the area for air being above said level as indicated at 12. At a point safely below the highest oil level, the outer shell 10' will of course be liquid tight, but above such level, said shell will preferably not be air tight. It is not necessary to go into details as to the particular construction of the shell.

Inside of the shell 10', is disposed my improved brake structure which includes a housing 13 that may be supported in any desired manner in spaced relation to the shell, as generally indicated at 14. The shell 10' may have removable sides 15, as shown in Fig. 10, in which bearings may be formed. Said housing 13, is provided with gear cavities 16 and 17, in which meshing gears 18 and 19 snugly fit peripherally and laterally. The meshing teeth 20 and 21, of said gears 18 and 19, respectively, form with the walls of said cavities, oil and air carrying pockets or buckets 22 and 23. One of the gears is fixedly mounted on connecting section 6, which may be the lower gear, the remaining gear 18, is an idler and is shown mounted on shaft 24. Both shafts may have suitable bearings in the casing, as will be clear in view of the present disclosure.

The meshing portions of the gears 18 and 19, which are vehicle driven members, are interposed in a combined air and oil path which includes filling or pressure chambers A and B, disposed on opposite sides of said mesh engagement. The full line arrows in Fig. 1, may designate the direction of rotation of the gears 18 and 19, when the car is moving forwardly, in which event, the chamber B would be the supply chamber and the oil or air would be carried around by the gears above and below their axes of rotation into chamber A, which latter would be the filling or active pressure chamber. If the car was going backwards, the gears 18 and 19 would rotate in the direction shown by the arrows in Fig. 3, in which event, chamber A would be the supply chamber and chamber B, the filling or pressure chamber. Thus, either chamber may function as the suction chamber, dependent upon the direction of rotation of the gears, as will presently appear.

Reference will next be made to the manner in which oil is supplied for braking purposes.

The housing or block 13, is provided with an oil supply pot 25, which opens at its lower end 26 to the reservoir and which functions to supply oil to chamber B, for congestion in chamber A, for braking action against forward travel of the vehicle. Said supply port 25, is provided with a non-return device or valve 27, having a stem 28, extending slidably through a guide 29 and having a spring abutment 30. A spring 31, normally acts to seat said valve 27 and likewise pressure from chamber B, would act to seat it. Thus, this valve freely and effectively opens for oil ingress to chamber B, when the gears 18 and 19 develop suction therein. Spring 31 is a relatively light spring but sufficiently heavy to seat said valve 27, against the head oil level 11.

An oil supply port 32, is provided for chamber A, and it opens at its lower end 33, to the oil reservoir. At its upper end, said port is provided with a non-return valve 34 which seats under the influence of pressure in chamber A, and opens when suction is developed in said chamber. Said valve 34, has a stem 35, slidable through a guide 36, and provided with a spring abutment 37. A spring 38, is interposed between said guide 36 and abutment 37, and is strong enough to seat said valve 34 against the head of oil at 11.

Reference will next be made to the air and oil path, only a part of which has been described, and which path, in the present construction is preferably an endless path.

I provide a passage leading from one chamber to the other and which as shown, comprises section 39, leading from chamber A, and a section 40, which latter is a connecting section of the passage leading from section 39, to section 41, which latter opens to chamber B. In section 39, and preferably close to chamber A, is a non-return valve 42, adapted to coact with valve seat 43, and having a stem 44 slidable through guide 45. Said stem 44 has a spring abutment 46, between which and said guide 45, a spring 47 is interposed to normally seat valve 42. Thus, valve 42 opens under egressing pressure developed in chamber A, and closes against entrance of air or oil to said chamber.

Reference will next be made to my improved controlling valve.

A sleeve 48, is disposed in section 41, of said passage in a manner to secure the same against rotary or longitudinal movement. Said sleeve 48 has a port 49, opening to its interior and communicating with section 40 which is a flow connection that is always open. Below this flow connection is a throttling port 50, in sleeve 48. Below said throttling port 50, is an air intake port 51. Below the sleeve 48, I fix a collar 52, having a valve seat 53, against which a non-return valve 54, is adapted to seat under the influence of pressure of any kind in chamber B. Said valve 54 has a stem 55, slidable through guide 56 and having a spring abutment 57. A spring 58, is interposed between said abutment 57 and guide 56 and normally acts to seat valve 54. One of the main functions of valve 54 is to prevent high oil pressure in chamber B, from frictionally interfering with free operation of a controlling valve which I am about to describe. This controlling valve, as shown, is a rotary valve, in the present form. Said valve is generally indicated at 59, and has an operating stem 60, that extends upwardly through housing 13 and shell 10', through a stuffing box 61, and is adapted to be operated through suitable connections, not shown, from the driver's seat. Said valve has a constant flow opening 63, to its interior bore 64, from section 40, and the bore of said valve has a throttle port 64', for coaction with port 50, for throttling egress of both air and oil. The bore of said valve 59, is partitioned off at 65 and extends downwardly through sleeve 48 and has a flange 66, bearing on the lower end of said sleeve. Said valve 59 has a bore 67, below partition 65, that opens to section 41, as clearly shown in Fig. 4. Below said partition 65, valve 59 has an air intake controlling port 68, which coacts with port 51, in sleeve 48. I have shown a pipe 69, leading from port 51, and extending upwardly to a point above the oil level and inside the shell 10', for intake of air that is not contaminated with foreign matter. I have also shown a pipe 70, leading downwardly from port 50, toward the oil reservoir.

I have shown a passage 71, leading from section 40 to chamber B, and which may be considered a by-pass, in one phase of the invention, and in another phase, this passage may be considered with sections 39 and 40, an endless path connecting chambers A and B. In any event, said passage 71 has a non-return device permitting egress of oil under pressure from chamber B and preventing ingress of either air or oil to said chamber. As shown, this device comprises a seat 72, on which a ball valve 73 may coact. A spring 74, engages said valve and a flange 75, and normally seats said closure 73.

I will next describe the operation of my improved brake mechanism.

In Fig. 1, I have shown the device in the non-braking adjustment and assuming that the car is advancing, the gears will rotate in the direction of the arrows (Fig. 1) causing suction in chamber B and tending to cause congestion in chamber A. However, in this adjustment, the controlling valve 59 is in the position for non-braking, as further shown in Figs. 4, 6 and 8. Thus, as a result of suction in chamber B, air will ingress through pipe 69, ports 51 and 68, down bore 67, opening valve 54, and from thence into chamber B. The reason why air suction will unseat valve 54 and not unseat valve 27, is that there is less resistance in unseating the downwardly opening valve 54 than the upwardly opening valve 27, and immediately after valve 54 has been unseated, the air will enter to satisfy suction, so much more readily than will the oil, that suction of the gears will be fully met by the air. However, if desired or necessary, spring 58 could readily be made so much lighter in tension than spring 31, as to further insure such action. The gears will convey the air over to chamber A, lifting valve 42, and the air will pass through sections 39 and 40, through 63 and down bore 64, to throttle port 64' and out pipe 70. Thus, while the actual travel of the air is not endless in the housing, or through a complete circuit in said housing, it is complete, with the air area 12, in shell 10', and is endless. As suction is constantly satisfied or vitiated in chamber B, by the incoming air, the valve 27 is not lifted, neither is valve 34. Further, the free flow of air, as described, eliminates drag on the wheels 18 and 19, when no braking function is performed, to a nugatory extent. As the valves 27 and 34 are not opened during this non-braking adjustment, it will be seen that the body of braking oil is clearly quiescent and does not even reach the wheels 18 and 19, when no braking function is performed, thereby eliminating oil drag.

Now assume that braking stress was being applied to the car on forward movement, or rather to retard forward movement thereof, then, the parts would be in the adjustment shown in Figs. 2, 7 and 9. We will assume that the air egress was not wholly shut off through throttling port 64' but nearly so. Port 68 will have been shut off to air ingress and the spring 58 will have closed valve 54. Now, suction that results from shutting off air ingress to chamber B, will quickly open valve 27, for a free flow of oil into chamber B, which now functions as the supply chamber. The gears 18 and 19 will quickly transfer the oil to chamber A, and as the latter is a filling chamber there is nothing to cause opening of valve 34. This oil passage will continue, forcing any air with it, up through section 39, lifting valve 42, across 40 and downwardly through bore 64, of the controlling valve, and out through throttling port 64', as shown in Fig. 2, which is adjusted to partly restrict the flow. Thus, it will be seen that the brake will, and in practice, actually does, function with a cushioning braking action that is devoid of jars, jolts and shatters common to usual brake applications. This is partly true by reason of the fact that the oil must travel from chamber A, clear around to throttling port 64' before it is restricted, other than by the friction in the path through which it travels. Thus, when you don't begin to restrict a relatively large body of oil until it has travelled to this extent, and at a point so remote from chamber A, you are bound to neutralize shocks. Further, all the air in the passage will be expelled. When releasing this braking action, the controlling valve will be returned to the Fig. 1 position, the air will rush into chamber B, vitiating suction sufficiently to cause valve 27, to seat, and the constant flow of air will expel the oil.

I will next describe the manner in which brake application is made against rearward travel of the car.

Assuming that the same extent of brake application were desired as described in connection with Fig. 2, the controlling valve would be adjusted to that position, or to any throttling position, and the gears 18 and 19, would be turning in the direction indicated by the arrows in Fig. 3. With the air shut off, as it would be, the gears 18 and 19 would develop suction in what will now be the supply chamber A, thereby acting to seat valve 42 and open valve 34. Thus, oil will flow into pressure chamber A, and be carried around by the gears to chamber B, which is now the filling chamber. It will readily be seen that any pressure in chamber B, will act to seat valves 27 and 54, and the latter will prevent pressure from reaching controlling valve 59 and thereby frictionally interfering with its free operation. The oil in chamber B, and whatever air is therein contained, will be forced up through by-pass 71, lifting ball valve 73, and passing into section 40. This oil may first fill section 40 and pass down section 39 to valve 42, but it cannot go further in that direction. It will then seek egress down the bore 64 of the controlling valve and out through pipe 70, the same as if braking stress were applied against forward travel of the car. Therefore, it will be seen that in braking against rearward travel of the car, I also get a cushioning application of brakage. It will also be clear that irrespective of the direction of travel of the car, brakage is applied by movement of the controlling valve in one and the same direction. Now it will be clear that while brakage is being applied, the oil will be under pressure in chamber B and through the passages to the throttle valve port. At this point, it may be informative to state that irrespective of the direction of car movement against which brakage is applied, the car will be retarded from going in an opposite direction. Take for instance as an example, the adjustment just described in connection with Fig. 3, with air ingress closed, and suppose, under some unusual condition that the car started forward, or was forced forward, well, the change in direction of the gears, with the passages filled with oil, would simply transform chamber A into a compression chamber and B would be the filling chamber.

Now assume that the brake against rearward movement of the car had been applied, as just described, and released, by adjusting the controlling valve 59 to the Fig. 1 position, then if the car moved rearward after such release, the action would be as follows:

The wheels 18 and 19, turning in the direction shown in Fig. 3, would cause suction in chamber A and compression in chamber B, thereby closing valves 42, 54 and 27, and opening valve 34. This would permit oil to flow from passage 32 into chamber A and over into chamber B, and the oil would ascend upwardly through passage 71 and out through pipe 70. To apply brakage to arrest backward movement, the controlling valve 59, would be closed thereby causing congestion in chamber B, to arrest the car. After the car had been brought to a position of rest by the application of brakage, against further backward movement, and the engine was either reversed or started to advance the car, then the wheels 18 and 19 would turn in the direction shown in Fig. 2. This would quickly empty chamber B and if the valve 59 were adjusted to the Fig. 1 position, air would flow in through or past valve 54, thereby forcing the oil residue out through section 39, as hereinbefore described. In this particular form of the device, I have not shown chamber A provided with an air intake, as is chamber B. Further, the extent of backing up travel of a car is necessarily very limited and is only done safely at a relatively slow speed, hence there is no danger of generating any heat in the oil. If it were desired to provide chamber A, with an air intake, it could be done without requiring invention, in view of the disclosure herein made.

It will now be clear that the operator does not directly open any oil admission valve to apply brakage, in fact, the operator does not have any physical operative connection with the oil admission at all, in a mechanical sense. The oil admission is initiated not only automatically, but wholly indirectly, as by shutting off ingress of air to the oil path, and thereby indirectly causing suction to initiate a flow of oil wholly responsive to and always adequate to the extent of suction present, thereby always insuring not only a requisite amount of oil, but in the most prompt response to the needs of the device. This is a primary reason why I avoid heating.

Likewise, in releasing brakage, the operator does not mechanically close the oil admission valve or valves, but he indirectly causes said valves to close by opening air ingress to vitiate or satisfy the suction action that would otherwise open oil admission to said gears.

In other words, both brakage and release of brakage, as far as oil control is concerned, are intangibly effected, in accordance with this novel mechanism and method. Thus, as a matter of physics, a condition is established, that results in keeping the oil out of drag or other association with the vehicle driven element, and this established condition is altered, or destroyed, to cause admission of oil to said elements.

It will also be clear that in one single path, which as shown, is endless, I provide means for either a flow of air or oil, with the vehicle driven elements intersecting said path, and in another phase of the invention, I provide an endless path for oil or air, and in the specific embodiment shown, these separate single paths are intersecting paths.

It is believed that my invention will be fully understood from the foregoing description, and while I have herein shown one specific form thereof, I do not wish to be limited thereto except for such limitations as the claims may import.

I claim:

1. A hydraulic brake mechanism including pressure chambers and vehicle driven gears interposed between said chambers causing either to act as a suction or pressure chamber dependent upon the direction of rotation of said gears, each chamber having a non-return oil supply device opening to suction and closing to pressure, and one of said chambers having a non-return air supply device opening to suction and closing to pressure.

2. A hydraulic brake mechanism including pressure chambers and vehicle driven gears interposed between said chambers causing either to act as a suction or pressure chamber dependent upon the direction of rotation of said gears, each chamber having a non-return oil supply device opening to suction and closing to pressure, and one of said chambers having a non-return device opening for egress from and closing to ingress to said chamber.

3. A hydraulic brake mechanism for vehicles including pressure chambers and vehicle driven gears interposed between said chambers and causing either to act as a suction or pressure chamber dependent upon the direction of rotation of said gears, each chamber having a non-return oil supply device opening to suction and closing to pressure, one of said chambers having a non-return oil and air device opening for egress from said chamber and closing for ingress thereto, and the remaining chamber having a non-return air supply device opening to suction and closing to pressure.

4. A vehicular hydraulic brake mechanism having a pressure chamber, vehicle driven gears causing said chamber to act as a pressure chamber when rearward braking is imposed, said chamber having a non-return oil supply device opening to suction and closing to pressure, and said chamber having a non-return device opening to pressure in said chamber for egress of oil therefrom on rearward application of brakage.

5. In combination, a motor vehicle having a frame and a differential, a drive shaft section extending toward said differential, a shaft section extending from said differential, a connecting section flexibly connected with said drive shaft section and said shaft section, and a hydraulic brake mechanism supported from said frame and operatively connected with said connecting section to apply brakage to the rear wheels of the vehicle through said differential.

In witness whereof, I have hereunto affixed my signature.

MARTIN M. FISHER.